United States Patent
Tanaka

(10) Patent No.: US 7,327,523 B2
(45) Date of Patent: Feb. 5, 2008

(54) OPTICAL ELEMENT

(75) Inventor: Keita Tanaka, Aichi (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/509,506

(22) Filed: Aug. 24, 2006

(65) Prior Publication Data

US 2007/0047057 A1  Mar. 1, 2007

(30) Foreign Application Priority Data

Aug. 24, 2005  (JP) .......................... P2005-242912

(51) Int. Cl.
*G02B 1/06* (2006.01)
*G02B 3/12* (2006.01)
*G02B 26/00* (2006.01)

(52) U.S. Cl. ...................... 359/665; 359/290; 359/297; 359/666

(58) Field of Classification Search ................ 359/290, 359/291, 297, 665, 666
See application file for complete search history.

(56) References Cited

U.S. PATENT DOCUMENTS

2007/0047119 A1* 3/2007 Tanaka ........................ 359/896

2007/0149939 A1* 6/2007 Tanaka ........................ 604/378

FOREIGN PATENT DOCUMENTS

JP  2001-228307 A  8/2001

* cited by examiner

*Primary Examiner*—David N. Spector
(74) *Attorney, Agent, or Firm*—Lerner, David, Littenberg, Krumholz & Mentlik, LLP

(57) ABSTRACT

An optical element includes an airtight container having opposing first and second end face walls in a thickness direction, and side walls connecting the first and second end face walls; a first liquid sealed in the container and having polarity or conductivity; a second liquid sealed in the container and not mixed with the first liquid so as to form an interface between the first liquid and the second liquid; and voltage applying means for applying a voltage to the first liquid. Further, the first liquid and the second liquid have substantially the same specific gravity, and the first liquid has less light transmittance than the second liquid. In a state in which the voltage is applied to the first liquid, the interface between the first liquid and the second liquid deforms, and a transmitting path of light is formed that passes through the first and second end face walls and propagates in the thickness direction of the container.

9 Claims, 9 Drawing Sheets

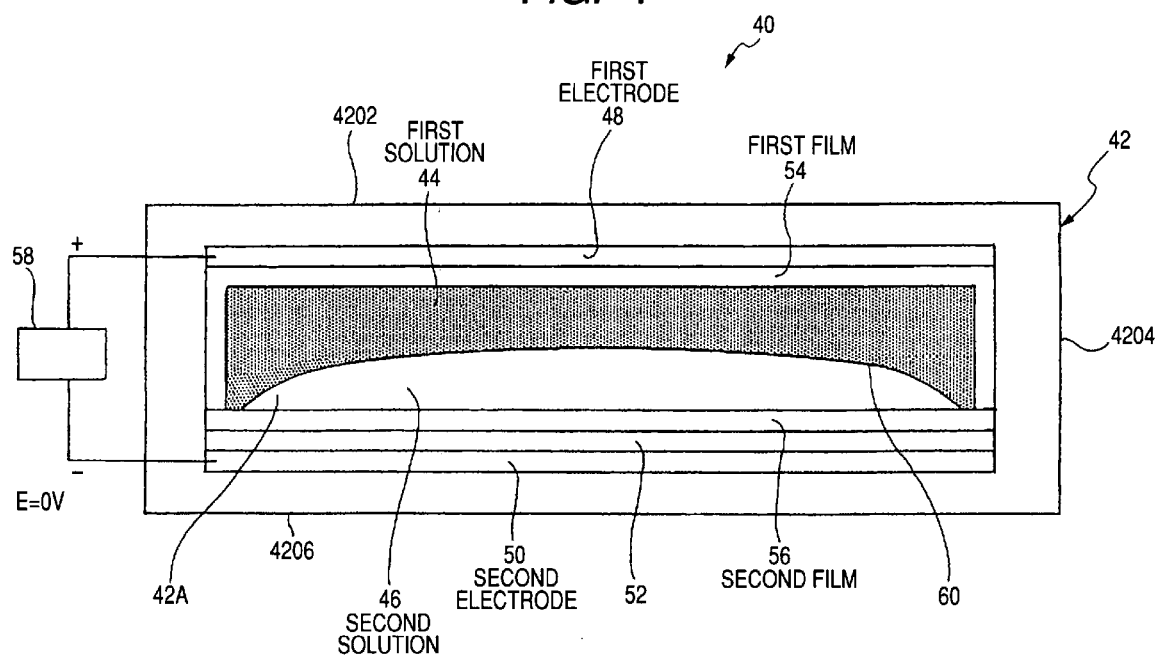

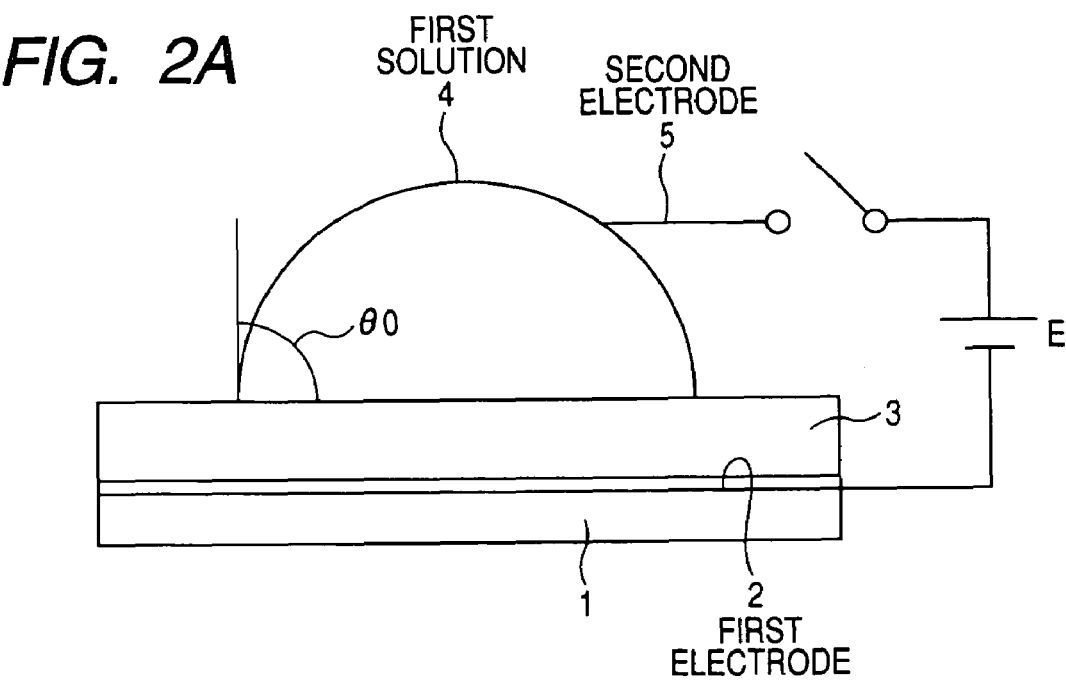
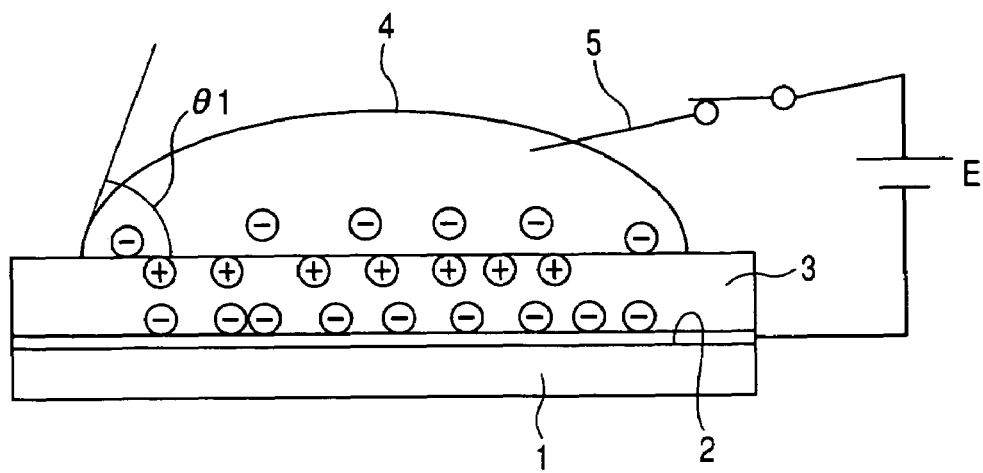

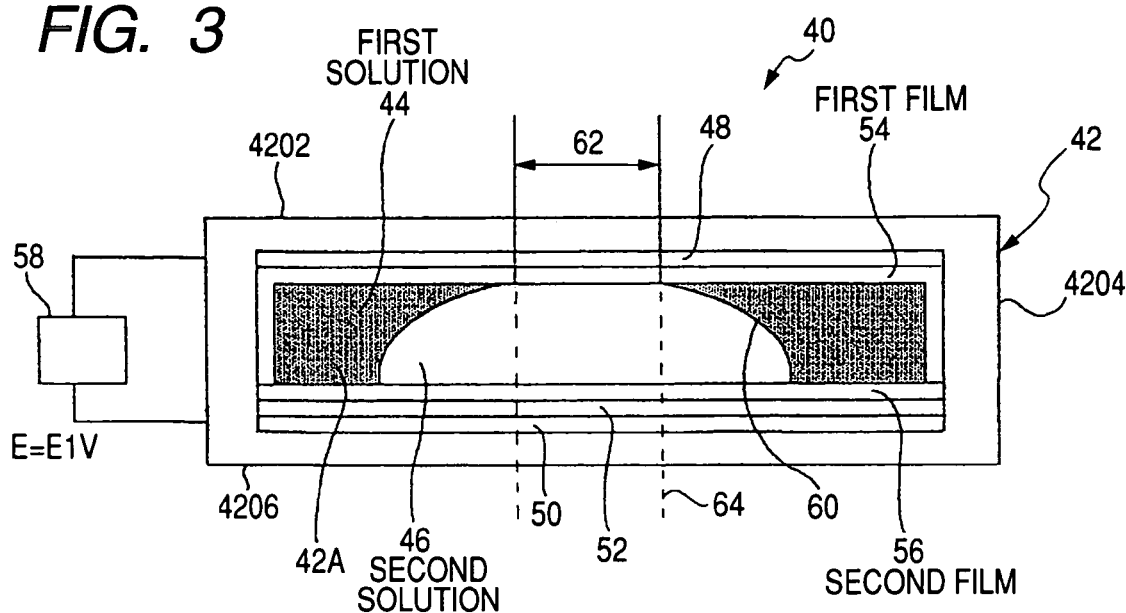
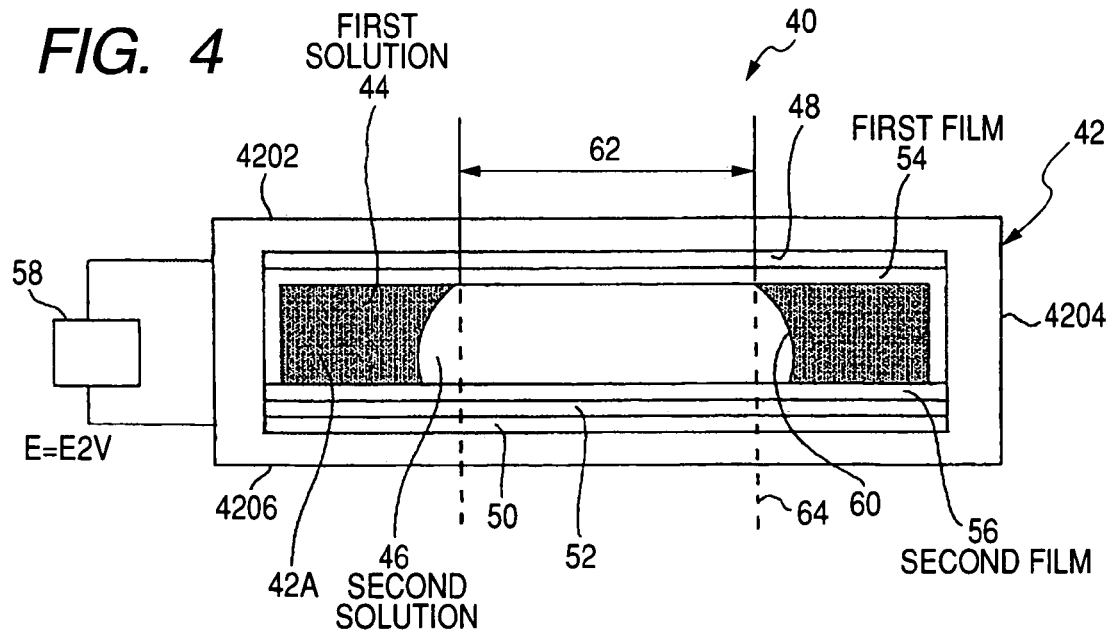

FIG. 11 SOLVENT DATA

| | | REFRACTIVE INDEX | SPECIFIC GRAVITY |
|---|---|---|---|
| A GROUP | WATER | 1.333 | 1 |
| | NITROMETHANE | 1.38056 | 1.1322 |
| | ACETIC ANHYDRIDE | 1.3904 | 1.082 |
| | METHYL ACETATE | 1.3614 | 0.9342 |
| | ETHYL ACETATE | 1.3719 | 0.902 |
| B GROUP | METHANOL | 1.3292 | 0.7915 |
| | ACETONITRILE | 1.34604 | 0.78745 |
| | ACETONE | 1.3591 | 0.788 |
| | ETHANOL | 1.361 | 0.789 |
| | PROPIONITRILE | 1.36585 | 0.7718 |
| | TETRAHYDROFURAN | 1.407 | 0.8892 |
| | N-HEXANE | 1.375 | 0.66 |
| | 2-PROPANOL | 1.37723 | 0.78505 |
| | 2-BUTANONE | 1.3814 | 0.805 |
| | N-BUTYRONITRILE | 1.38385 | 0.7954 |
| | 1-PROPANOL | 1.3862 | 0.8053 |
| | 1-BUTANOL | 1.3993 | 0.81 |
| C GROUP | DIMETHYLSULFOXIDE | 1.4795 | 1.1 |
| | CHLOROBENZENE | 1.5248 | 1.107 |
| | ETHYLENE GLYCOL | 1.43063 | 1.1135 |
| | FORMAMIDE | 1.44754 | 1.1334 |
| | NITROBENZENE | 1.5529 | 1.205 |
| | PROPYLENE CARBONATE | 1.4209 | 1.2065 |
| | 1, 2-DICHLOROETHANE | 1.4443 | 1.2569 |
| | CARBON DISULFIDE | 1.62803 | 1.2632 |
| | CHLOROFORM | 1.4476 | 1.484 |
| | BROMOBENZENE | 1.5602 | 1.4952 |
| | CARBON TETRACHLORIDE | 1.4607 | 1.589 |
| | TRICHLOROACETIC ANHYDRIDE | 1.484 | 1.69 |
| D GROUP | TOLUENE | 1.4967 | 0.866 |
| | BENZENE | 1.50108 | 0.8787 |
| | ETHYLENEDIAMINE | 1.454 | 0.898 |
| | N,N-DIMETHYLACETAMIDE | 1.423 | 0.9429 |
| | N,N-DIMETHYLFORMAMIDE | 1.42803 | 0.9445 |
| | TRIBUTYL PHOSPHATE | 1.4215 | 0.976 |
| | PYRIDINE | 1.5092 | 0.98272 |
| | BENZONITRILE | 1.5289 | 1.01 |
| | ANILINE | 1.5863 | 1.022 |
| | 1, 4-DIOXANE | 1.4175 | 1.029 |
| | HEXAMETHYLPHOSPHORAMIDE | 1.4579 | 1.0295 |

OPTICAL ELEMENT

CROSS-REFERENCE TO RELATED APPLICATIONS

The present application claims priority from Japanese Patent Application No. JP 2005-242912 filed on Aug. 24, 2005, the disclosure of which is hereby incorporated by reference herein.

BACKGROUND OF THE INVENTION

1. Field of the Invention

The present invention relates to an optical element.

2. Description of the Related Art

An optical element 10 that adjusts a quantity of transmitted light by using electrocapillarity (electrowetting phenomenon) has been suggested (see JP-A-2001-228307).

As shown in FIG. 13, the optical element 10 includes an airtight container 16 that has end face walls 12 opposite to each other in a thicknesswise direction, and side walls 14 connecting the end face walls 12, a first liquid 20 that is sealed in the container 16 and has polarity or conductivity, and a second liquid 22 that is sealed in the container 16 and has larger transmittance than the first liquid 20.

In addition, as the first liquid 20 and the second liquid 22, liquids having properties that are not mixed with each other, and liquids that have the same specific gradient are used. In a case in which only the first liquid 20 and the second liquid 22 are sealed in the container 16 without air permeating into the container 16, even though the container 16 is made to rotate or the container 16 is shaken, the initial state in which only the first liquid 20 and the second liquid 22 are sealed in the container 16 is maintained, and a state in which the interface 24 is substantially parallel to the end face wall 12 is maintained.

In FIG. 13, reference numeral 28 indicates an electrode for applying a voltage to the first liquid 20, and reference numeral 30 indicates an insulating film to cover the electrode 28.

In addition, when the voltage is applied to the first liquid 20 by the voltage applying means, by electrocapillarity, the interface 24 between the first liquid 20 and the second liquid 22 deforms, as shown by solid lines and broken lines of FIG. 13, and thus a transmitting path 18 of light that passes through the end face wall 12 and propagates in a thicknesswise direction in the container 16 is formed.

Specifically, in a state in which a voltage is not applied, as shown by solid lines in FIG. 13, the first liquid 20 extends over the entire region in a direction orthogonal to a light transmitting direction, which results in obstructing light transmission or reducing a quantity of transmitted light. At this time, if an applied voltage is increased, as shown by broken lines in FIG. 13, the second liquid 22 comes into contact with the two end face walls 12 to form a transmitting path 18. By adjusting an applied voltage, a contact area between the second liquid 22 and one end face wall 12 is increased or decreased, and thus the size of the transmitting path 18 is adjusted.

Meanwhile, when the optical element 10 is mounted on an imaging device, such as a digital camera, it is required for the imaging device to be small-sized, and it is required to reduce the size of the optical element 10 in a thicknesswise direction (light transmitting direction).

Accordingly, there is a need for an optical element capable of achieving a small size.

SUMMARY OF THE INVENTION

According to an embodiment of the invention, an optical element includes an airtight container having opposing first and second end face walls in a thickness direction, and side walls connecting the first and second end face walls; a first liquid sealed in the container and having polarity or conductivity; a second liquid sealed in the container and not mixed with the first liquid so as to form an interface between the first liquid and the second liquid; and voltage applying means for applying a voltage to the first liquid. Further, the first liquid and the second liquid have substantially the same specific gravity, and the first liquid has less light transmittance than the second liquid. In a state in which the voltage is applied to the first liquid, the interface between the first liquid and the second liquid deforms, and a transmitting path of light is formed that passes though the first and second end face walls and propagates in the thickness direction of the container. A first film is formed over the entirety of an inner surface of the first end face wall, the wettability of the first film with respect to the first liquid being higher than the wettability of the first film to the second liquid, a second film is formed over the entirety of an inner surface of the second end face wall, the wettability of the second film with respect to the second liquid being higher than the wettability of the second film to the first liquid. The voltage applying means includes a first electrode provided on the first end face wall, and a second electrode provided on the second end face wall, and in a state in which the voltage is not applied to the first liquid, the second liquid is located on the second film, and the first liquid extends over the entire region of a direction orthogonal to a light transmitting direction.

According to an embodiment of the invention, the second film is formed on the entire region of an inner surface of the second end face wall, in which the wettability of the second film with respect to the second liquid is higher than the wettability of the second film with respect to the first liquid. Accordingly, in a state in which a voltage is not applied to the first liquid, the first liquid spreads flatly over the entire region of a direction orthogonal to a light transmitting direction in a state in which the second liquid disperses uniformly with respect to the second film. The size of the accommodating chamber in a thickness direction (light transmitting direction) can be reduced, and a small-sized optical element can be achieved.

BRIEF DESCRIPTION OF THE DRAWINGS

FIG. 1 is a diagram illustrating an optical element 40 in a state in which a voltage is not applied;

FIG. 2A is a diagram illustrating a principle of electrocapillarity, which illustrates a state before a voltage is applied;

FIG. 2B is a diagram illustrating a principle of electrocapillarity, which illustrates a state after a voltage is applied;

FIG. 3 is a diagram illustrating a state in which a first voltage E1 is applied to an optical element 40;

FIG. 4 is a diagram illustrating a state in which a second voltage E2 larger than a first voltage E1 is applied to an optical element 40;

FIG. 11 is a diagram illustrating numerical values of specific gravity and refractive indexes of various used liquids;

DETAILED DESCRIPTION

Figure 5:
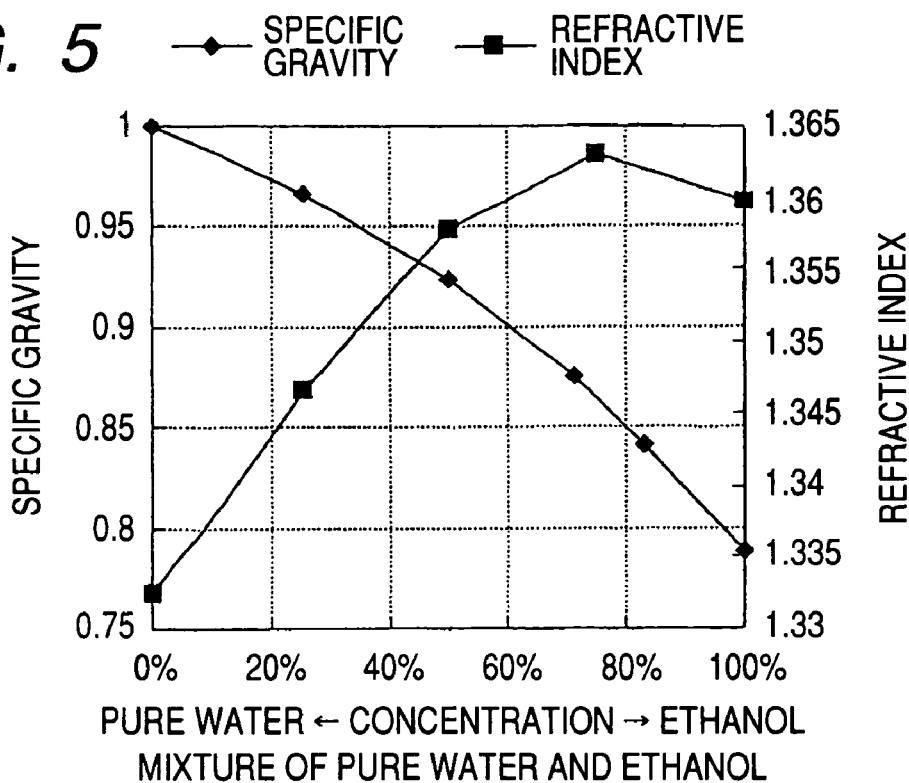
FIG. 5 is a graph illustrating characteristics of a mixing ratio of pure water and ethanol, specific gravity, and a refractive index.

The subject matter of the present invention is related to the subject matter of U.S. application Ser. No. 11/359,414 filed on Feb. 23, 2006 and Ser. No. 11/365,586 filed on Mar. 2, 2006, the disclosures of which are hereby incorporated by reference herein.

First, a principle of electrocapillarity (electrowetting phenomenon) that is used by an optical element according to an embodiment of the invention will be described.

FIG. 2A is a diagram illustrating a principle of electrocapillarity, which illustrates a state before a voltage is applied, and FIG. 2B is a diagram illustrating a principle of electrocapillarity, which illustrates a state after a voltage is applied.

As shown in FIG. 2A, a first electrode 2 is formed on a surface of a substrate 1, and an insulating film 3 is formed on the first electrode 2.

A first liquid 4 that has polarity or conductivity is disposed on a surface of the insulating film 3, and a second electrode 5 is electrically connected to the first liquid 4.

As shown in FIG. 2A, in a state in which a voltage E is not applied between the first electrode 2 and the second electrode 5, a surface of the first liquid 4 forms almost a spherical shape, in which the convex is formed upward, by means of surface tension. At this time, an angle θ between a surface of the insulating film 3 and a surface of a portion of the first liquid 4 which comes into contact with the insulating film 3, that is, a contact angle θ is referred to as θ0.

As shown in FIG. 2B, in a state in which a voltage E is applied between the first electrode 2 and the second electrode 5, plus charges are charged on the surface of the insulating film 3, and an electric field (electrostatic force) is applied to molecules that form the first liquid 4. Thereby, the molecules that form the first liquid 4 are attracted, such that wettability of the first liquid 4 with respect to the insulating film 3 is improved, and the contact angle θ becomes θ1 that is smaller than θ0. Further, when the voltage E is increased, the contact angle θ is decreased.

This phenomenon is called electrocapillarity.

Next, the optical element 40 according to the embodiment of the invention will be described.

FIG. 1 is a sectional view illustrating a structure of the optical element 40.

As shown in FIG. 1, the optical element 40 includes a container 42, a first liquid 44, a second liquid 46, and a voltage applying section.

The container 42 has a first end face wall 4202 and a second end face wall 4206 that are opposite to each other in a thicknesswise direction, and side walls 4204 that connect the first and second end face walls 4202 and 4206. The container 42 has an accommodating chamber 42A that is made to be airtight by the side walls 4204 that connect the first and second end face walls 4202 and 4206.

In the present embodiment, the first and second end face walls 4202 and 4206 form a circular plate shape having the same diameter, the side wall 4204 forms a cylindrical shape having the same outer diameter as the outer diameter of each of the first and second end face walls 4202 and 4206, and the accommodating chamber 42A has a flat cylindrical column shape.

Further, each of the first and second end face walls 4202 and 4206, and the side walls 4204 is formed of an insulating material, and each of the first and second end face walls 4202 and 4206 is formed of a light transmitting material.

As a material that forms each of the first and second end face walls 4202 and 4206, a transparent insulating synthesis resin material or a transparent glass material may be used.

On an inner side of the first end face wall 4202, a first electrode 48 (positive electrode) that applies a voltage to the first liquid 44 is formed, and in the present embodiment, the first electrode 48 is formed in a circular plate shape over the entire region of the first end face wall 4202.

On an inner side of the second end face wall 4206, a second electrode 50 (negative electrode) that applies a voltage to the second liquid 46 is formed, and in the present embodiment, the second electrode 50 is formed in a circular plate shape over the entire region of the second end face wall 4206.

On an inner side of the second electrode 50, an insulating layer 52 is formed in a circular plate shape so as to cover the entire region of the second electrode 50.

On the entire inner region of the first electrode 48, a first transparent film 54 that transmits light is formed. In the present embodiment, the first film 54 is continuously formed over a region ranging from the outer circumference of the first electrode 48 to the entire circumference of an inner surface of the side walls 4204, in addition to the entire inner region of the first electrode 48.

The first film 54 is configured such that wettability of the first film 54 with respect to the first liquid 44 is higher than wettability of the first film 54 with respect to the second liquid 46. That is, a contact angle of the first liquid 44 with respect to the first film 54 becomes smaller than a contact angle of the second liquid 46 with respect to the first film 54.

The first film 54 is a film having a hydrophilic property (hydrophilic film), and can be formed by applying a hydrophilic polymer or a surfactant onto the inner surfaces of the side walls 4204. Further, as forming materials of the first film 54, various known materials in the related art may be used.

On the entire inner region of the second electrode 50, a second transparent film 56 that transmits light is formed.

The second film 56 is configured such that wettability with respect to the second liquid 46 is higher than wettability with respect to the first liquid 44. That is, a contact angle of the second liquid 46 with respect to the second film 56 becomes smaller than a contact angle of the first liquid 44 with respect to the second film 56. For example, the contact angle of the second liquid 46 with respect to the second film 56 is within a range of 0 to 30 degrees.

The contact angle of the second liquid 46 with respect to the second film 56 becomes smaller than a contact angle of the second liquid 46 with respect to a lyophobic film made of a general fluorine resin.

The second film 56 is a film having a lipophilic property (lipophilic film), and can be formed by sintering a material using silicone as a principal ingredient or depositing a material, such as an amorphous fluorine resin. Further, as forming materials of the second film 56, various known materials according in the related art may be used.

Outside the container 42, a power supply 58 whose output voltage varies is provided, and a positive voltage output terminal of the power supply 58 is electrically connected to the first electrode 48, and a negative voltage output terminal of the power supply 58 is electrically connected to the second electrode 50.

The first electrode 48, the second electrode 50, and the power supply 58 form the voltage applying section.

The first liquid 44 having polarity or conductivity is sealed in the container 42.

The second liquid 46 is not mixed with the first liquid 44, and it is sealed in the container 42.

Further, the first liquid 44 and the second liquid 46 have substantially the same specific gravity, and the first liquid 44 has smaller transmittance than the second liquid 46.

In the present embodiment, the second liquid 46 is made of silicone oil, and the first liquid 44 is configured by mixing pure water, ethanol, and ethylene glycol, and adjusting the specific gravity and the refractive index of the mixture thereof to be substantially equal to those of the silicone oil.

Further, the second liquid 46 is silicone oil, and the second film 56 is formed by sintering a material using the above-mentioned silicone as a principal ingredient or the second film 56 is made of a material of an amorphous fluorine resin. In this case, wettability of the second liquid 46 with respect to the second film 56 is considerably increased. As a result, a contact angle of the second liquid 46 with respect to the second film 56 is considerably decreased. For example, the contact angle is within a range of 0 to 20 degrees.

Further, the first liquid 44 and the second liquid 46 will be described in detail below.

The entire region of the first liquid 44 that is disposed on an inner surface of the first end face wall 4202 is opposite to the first electrode 48 with the first film 54 interposed therebetween. In addition, the entire region of the second liquid 46 that is disposed on an inner surface of the second end face wall 4206 is opposite to the second electrode 50 with the second film 56 and the insulating film 52 interposed therebetween.

Accordingly, if the voltage is applied to the first electrode 48 and the second electrode 50 from the power supply 58, a voltage is applied to the first liquid 44.

Next, an operation of the optical element 40 will be described.

As shown in FIG. 1, in a state in which a voltage is not applied to the first electrode 48 and the second electrode 50 from the power supply 58 (E=0 V), a shape of the interface 60 between the first and second liquids 44 and 46 is determined by the balance of the surface tension of the first and second liquids 44 and 46 and the interface tension of the second film 56.

Accordingly, if the difference between a contact angle of the first liquid 44 with respect to the second film 56, and a contact angle of the second liquid 46 with respect to the second film 56 is large, the second liquid 46 spread flatly on the second film 56, and the shape of the interface 60 between the first liquid 44 and the second liquid 46 becomes a curved surface that is similar to a flat surface.

Further, the first liquid 44 is disposed to cover a region ranging from the first film 54 on the first end face wall 4202 to the first film 54 on the side walls 4204.

Accordingly, portions of the first liquid 44 that are located circular portions near the interface between the side walls 4204 and the second end face wall 4206 directly come into contact with the second film 56, but the second liquid 46 does not come into contact with the side walls 4204.

For this reason, the circular portions where the first liquid 44 comes into contact with the second film 56 are opposite to the second electrode 50 with the second film 56 and the insulating film 52 interposed therebetween, without the second liquid 46 being interposed therebetween.

At this time, the first liquid 44 extends over the entire region in a direction orthogonal to a light transmitting direction, and thus light propagating in a thicknesswise direction of the container 40 is prevented.

Next, if the voltage E is applied to the first electrode 48 and the second electrode 50 from the power supply 58, by electrocapillarity, the interface 60 deforms to form a convex curved surface (spherical surface) from the second liquid 46 to the first liquid 44, such that the center of the interface 60 becomes approach the first end face wall 4202. As a result, the first liquid 44 has the smallest thickness at the center thereof (that is, the center thereof is thinnest), and the thickness of the first liquid 44 becomes larger toward the outer circumference of the accommodating chamber 42A from the center thereof.

At this time, the contact angle of the first liquid 44 with respect to the second film 56 becomes smaller than 90 degrees, and in the portions of the side walls 4204 (second film 56), the first liquid 44 enters the second liquid 46 along the side wall 4204.

Further, if the voltage E increases to the first voltage E1, as shown in FIG. 3, the inclination of the convex curved surface (spherical surface) of the interface 60 becomes rapid, and the center of the interface 60 comes into contact with the first end face wall 4202 (first film 54).

Thereby, in a region of the first end face wall 4202 (first film 54) which the interface 60 comes into contact with, the first liquid 44 does not exist, and a region 62 where only the second liquid 46 exists is formed in the center of the accommodating chamber 42A (centers of the first and second end face walls 4202 and 4206), which results in forming a transmitting path 64 of light that passes through the first and second end face walls 4202 and 4206, and propagates in a thicknesswise direction of the container 42.

If the second voltage E2 larger than the first voltage E1 is applied to the first electrode 48 and the second electrode 50 from the power supply 58 (E2>E1), as shown in FIG. 4, the inclination of the convex curved surface (spherical surface) of the interface 60 becomes further rapid.

In addition, a diameter of the region 62 which is formed in the center of the accommodating chamber 42A (centers of the first and second end face walls 4202 and 4206) and in which only the second liquid 46 exists is increased, and the diameter of the light transmitting path 64 is increased.

Accordingly, by adjusting the voltage applied to the first electrode 48 and the second electrode 50 from the power supply 58, it is possible to increase or decrease the diameter of the region 62 where only the second liquid 46 exists Therefore, it is possible to perform a diaphragm operation for increasing or decreasing a diameter of the light transmitting path 64.

According to the present embodiment, over the entire region of an inner surface of the first end face wall 4202, a first film 54 is formed in which wettability with respect to the first liquid 44 is higher than wettability with respect to the second liquid 46. Further, over the entire region of an inner surface of the second end face wall 4206, a second film 56 is formed in which wettability with respect to second liquid 46 is higher than wettability with respect to the first liquid 44.

Accordingly, in a state in which the voltage is not applied to the first liquid 44, the first liquid 44 extends over the entire region in a direction orthogonal to the light transmitting direction in a state in which the second liquid 46 spread flatly with respect to the second liquid film 56. Therefore, the size between the first end face wall 4202 and the second end face wall 4206, that is, the size of the accommodating chamber 42A in the thicknesswise direction (light transmitting direction) can be reduced, which results in reducing the size of the optical element 40.

Further, according to the present embodiment, it is possible to reduce the voltage applied to the first liquid 44.

That is, an electrowetting phenomenon refers to a phenomenon when a shape of the interface between the first liquid 44 and the second liquid 46 varies due to an amount of a charge charged in the insulating film 52. That is, the electrowetting phenomenon refers to a phenomenon when a contact angle of the second liquid 46 can vary by the charge amount.

A correlation exists between the charge and the contact angle of the second liquid. Therefore, in a state in which the voltage is not applied, if the contact angle is increased, a voltage necessary for further increasing the contact angle of the second liquid 46 is also increased. Further, in a state in which the voltage is not applied, if the contact angle is decreased, a voltage necessary for further increasing the contact angle of the second liquid is also decreased.

Accordingly, in the present embodiment, since the contact angle θ1 of the second liquid 46 with respect to the second film is extraordinary small in a state in which the voltage is not applied, a voltage to be applied is reduced, and the second liquid 46 can be made to come into contact with the first end face surface 4202 at a small contact angle. Therefore, it is advantageous in that only a small amount of voltage is needed, such that the amount of power consumed can be reduced.

Further, according to the present embodiment, since the first film 54 is formed on the first end face wall 4202 at the side of the first liquid 44, wettability of the first liquid 44 with respect to the first film 54 is superior. Accordingly, after the second liquid 46 comes into contact with the first end face wall 4202, when it is separated from the first end face wall 4202, the second liquid 46 may be easily spaced apart from the first film 54, and a diaphragm operation can be performed at high speed.

Further, since the second film 56 is formed on the second end face wall 4206 where the second liquid 46 is located, when the first liquid 44 extends up to the location of the second film 56, the liquid surface of the first liquid 44 can smoothly move on the second film 56. Therefore, a diaphragm operation can be performed at high speed.

Further, in the present embodiment, the case has been described in which the first electrode 48 is formed over the entire region of the first end face wall 4202. However, when the voltage is applied to the first electrode 48, the first electrode 48 may apply the voltage to the first liquid 44 so as to vary the shape of the interface between the first liquid 44 and the second liquid 46.

Accordingly, the first electrode 48 does not necessarily need to be provided over the entire region of the first end face wall 4202. That is, the first electrode 48 may be formed on only a portion of the first end face wall 4202 that always faces the first liquid 44, for example, an outer circumferential portion of the first end face wall 4202, without depending on the variation in the shape of the interface between the first liquid 44 and the second liquid 46.

As such, when the first electrode 48 is formed on only the outer circumferential potion of the first end face wall 4202, the first electrode 48 does not exist on a center portion excluding the outer circumferential portion of the first end face wall 4202, that is, the light transmitting path 64, and thus it is optically advantageous.

Further, according to the present embodiment, the case has been described in which the second electrode 50 is formed over the entire region of the second end face wall 4206. However, when the voltage is applied to the second electrode 50, the second electrode 50 may apply the voltage to the first liquid 44 through the insulating film 52 so as to vary the shape of the interface between the first liquid 44 and the second liquid 46.

Accordingly, the second electrode 50 does not necessarily need to be provided over the entire region of the second end face wall 4206. That is, the second electrode 50 may be formed on only a portion of the second end face wall 4206 that always faces the first liquid 44, for example, an outer circumferential portion of the second end face wall 4206, without depending on the variation in the shape of the interface between the first liquid 44 and the second liquid 46.

As such, when the second electrode 50 is formed on only the outer circumferential portion of the second end face wall 4206, the second electrode 50 does not exist on a center portion excluding the outer circumferential portion of the second end face wall 4206, that is, the light transmitting path 64, and thus it is optically advantageous.

Next, the first liquid 44 and the second liquid 46 that are used in the present embodiment will be described.

The three kinds of liquids, each of which has different specific gravity and a different refractive index, are mixed to obtain the first liquid 44. The inventors have discovered that if a mixing ratio of the three kinds of liquids is changed, the specific gravity and the refractive index of the first liquid 44 are varied over a wide range.

For example, a case in which the first liquid 44 is obtained by using two kinds of liquids will be described.

In this case, pure water and ethanol are used as two kinds of liquids to obtain the first liquid 44, and a mixing ratio between the two liquids is varied.

As shown in FIG. 5, if the mixing ratio between the two liquids is varied, the specific gravity and the refractive index of the first liquid 44 are varied in a straight line shape or a curved shape.

Further, the pure water and the ethylene glycol are used as two kinds of liquids to obtain the first liquid 44, and a mixing ratio between the two liquids is varied.

Figure 6:
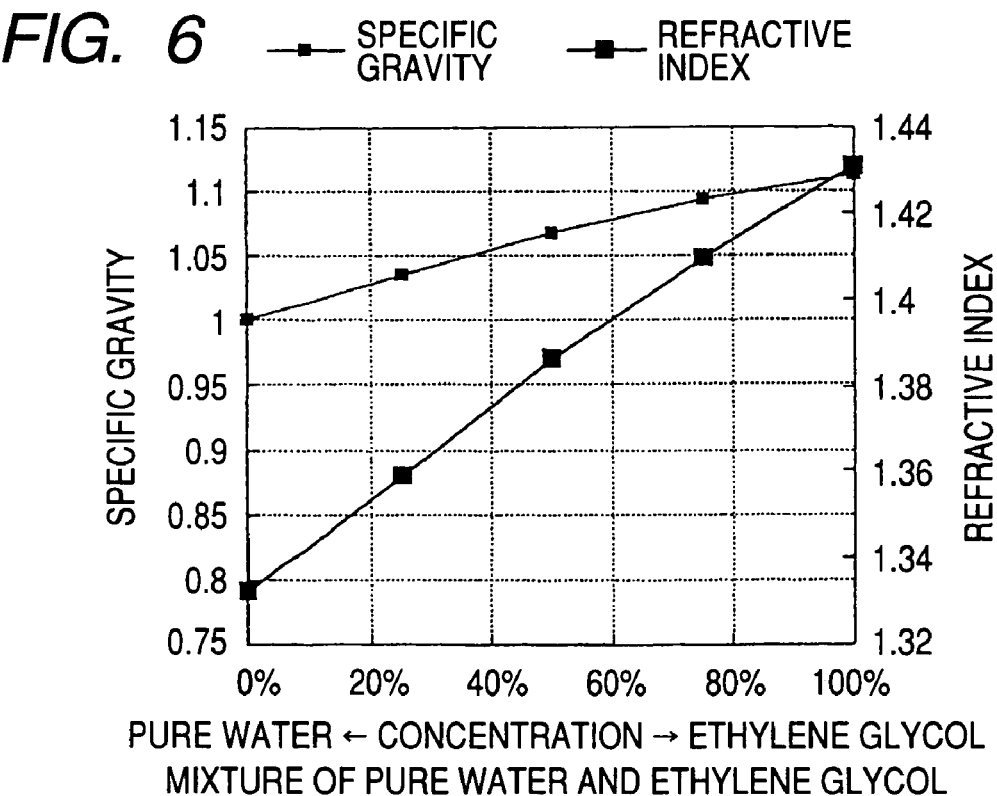
FIG. 6 is a graph illustrating characteristics of a mixing ratio of pure water and ethylene glycol, specific gravity, and a refractive index.

As shown in FIG. 6, if the mixing ratio between the two liquids is varied, the specific gravity and the refractive index of the first liquid 44 are varied in a straight line shape or a curved shape.

Further, the specific gravity of the pure water is 1.0, and the refractive index of the pure water is 1.333. The specific gravity of the ethanol is 0.789, and the refractive index of the ethanol is 1.361. The specific gravity of ethylene glycol is 1.113, and the refractive index of ethylene glycol is 1.430.

Figure 7:
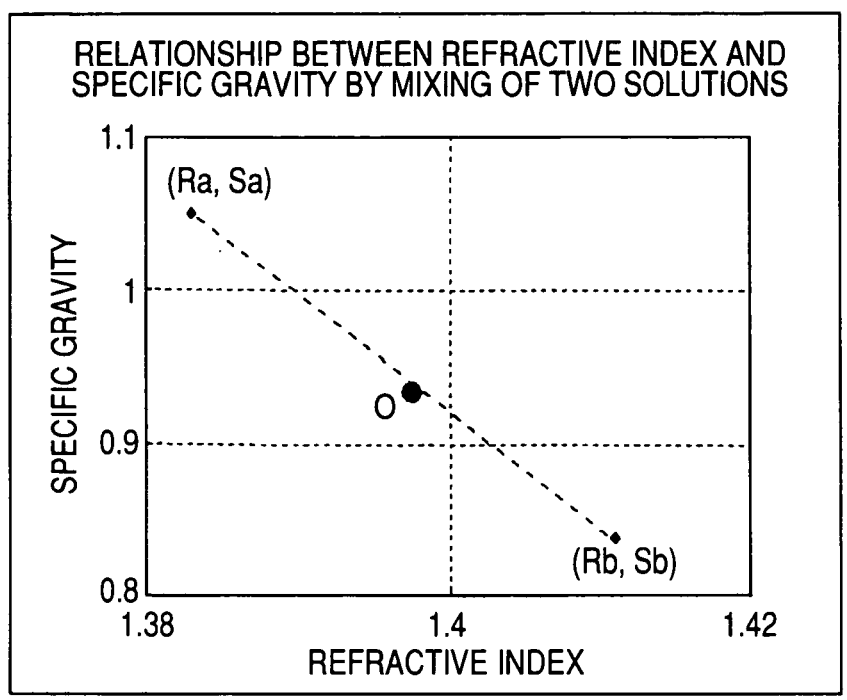
FIG. 7 is a diagram illustrating an adjustment range of a refractive index and specific gravity in a case in which two kinds of liquids A and B are mixed.

That is, as shown in FIG. 7, when the first liquid 44 is obtained by mixing two kinds of liquids A (whose refractive index is Ra, and whose specific gravity is Sa), and B (whose refractive index is Rb, and whose specific gravity is Sb), by varying a mixing ratio between the two kinds of liquids A and B, the refractive index and the specific gravity of the first liquid 44 can be adjusted on only a straight line connecting the coordinates (Ra, Sa) and the coordinates (Rb, Sb), as shown by the coordinates O in the drawing.

Meanwhile, a case will be described in which the first liquid 44 is obtained by using three kinds of liquids, and a mixing ratio among the three kinds of liquids is varied.

In this case, for example, pure water, ethanol, and ethylene glycol are used as three kinds of liquids to obtain the first liquid 44, and a mixing ratio among the three kinds of liquids is varied.

Figure 8:
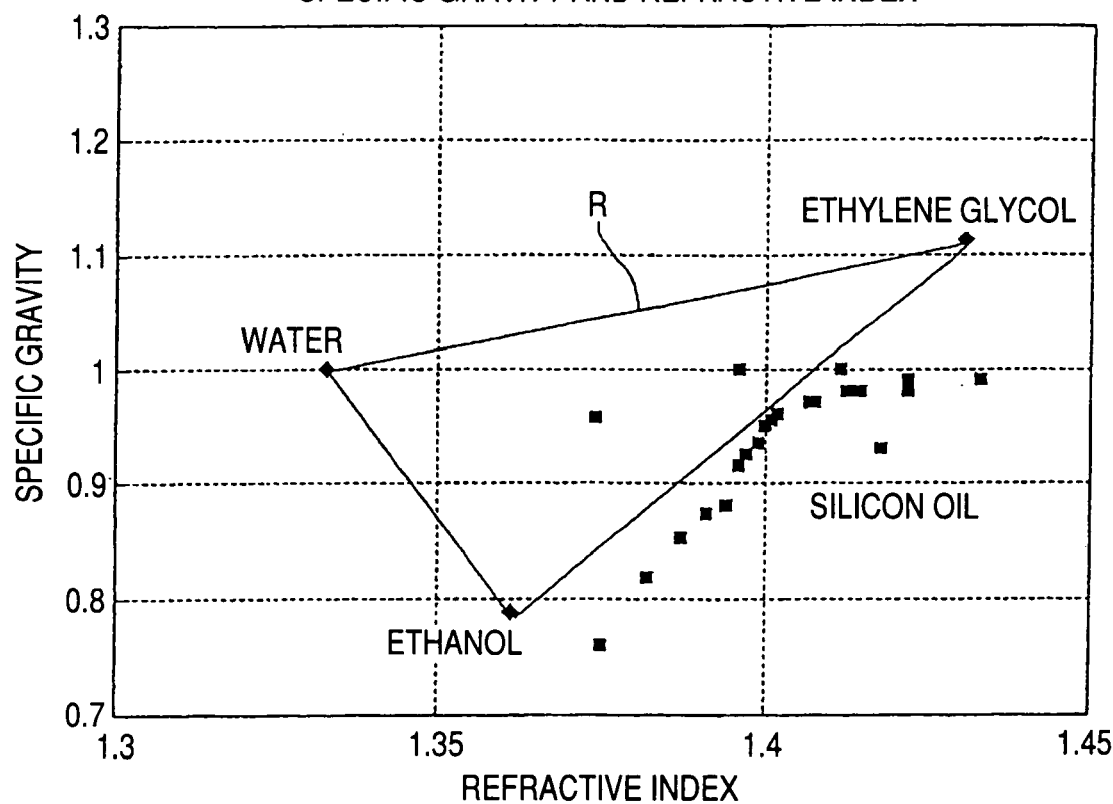
FIG. 8 is a diagram illustrating specific gravity and refractive indexes of pure water, ethanol, and ethylene glycol.

As shown in FIG. 8, by varying the mixing ratio among the pure water, the ethanol, and the ethylene glycol, the specific gravity and the refractive index of the first liquid 44 can be varied in a large triangular region R that connects the respective coordinates of the pure water, the ethanol, and the ethylene glycol.

Figure 9:
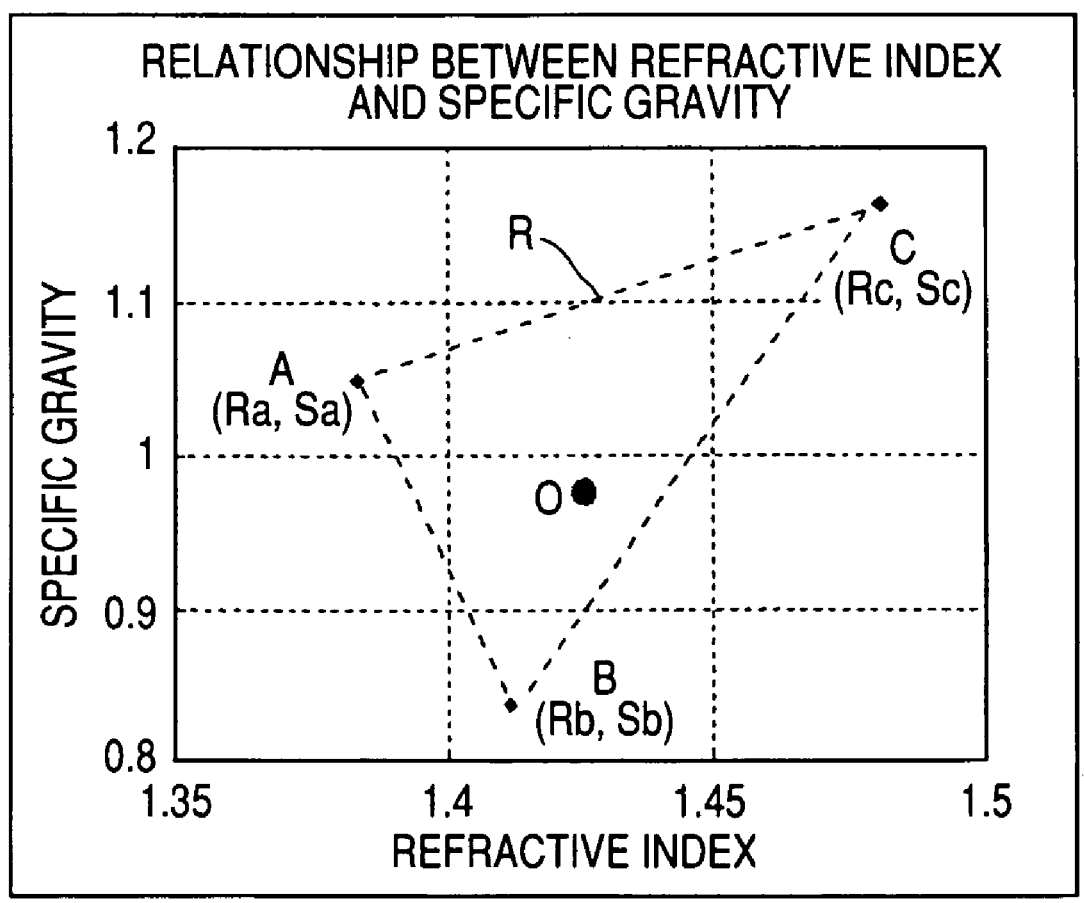
FIG. 9 is a diagram illustrating an adjustment range of a refractive index and specific gravity in a case in which three kinds of liquids A, B, and C are mixed.

That is, as shown in FIG. 9, when the first liquid 44 is obtained by mixing three kinds of liquids A (whose refractive index is Ra, and whose specific gravity is Sa), B (whose refractive index is Rb, and whose specific gravity is Sb), and C (whose refractive index is Rc, and whose specific gravity is Sc), by varying a mixing ratio among the three kinds of liquids A, B, and C, the refractive index and the specific gravity of the first liquid 44 can be adjusted in a triangular region R connecting the coordinates (Ra, Sa), the coordinates (Rb, Sb), and the coordinates (Rc, Sc), as shown by the coordinates O in the drawing.

Meanwhile, in FIG. 8, the coordinates of the specific gravity and the refractive index of each of silicone oils on the market are scattered.

Therefore, the silicone oils on the market that are scattered in the triangular region R are used as the second liquid 46, and the pure water, the ethanol, and the ethylene glycol are mixed to obtain the first liquid 44 whose specific gravity and refractive index are made to become substantially the same as the silicone oil.

The first liquid 44 can be formed by mixing carbon black (which does not transmit light) into a liquid obtained by mixing the pure water, the ethanol, and the ethylene glycol.

Accordingly, the carbon black is mixed in the first liquid 44, so that the first liquid 44 is blackish, and can intercept light with a thickness of about 0.1 mm. Therefore, it is advantageous in that the size of the optical element is decreased.

Further, as the material that does not transmit the light, a pigment or the like may be used, instead of the carbon black.

If the first liquid 44 and the liquid 46 are formed to have the same refractive index, a lens effect can be prevented from occurring at the interface 60, and the diaphragm operation can be surely performed.

Further, if the first liquid 44 is formed by mixing the ethanol with the water, the freezing point (melting point) can be lowered, and the first liquid 44 can be prevented from freezing in a cold region. As a result, the optical element 40 can be used in a cold region.

In the optical element 40, the freezing point of the ethanol may be −114 degrees, the freezing point of ethylene glycol may be −13 degrees, and the freezing point of the first liquid 44 may be −40 degrees or less.

According to the optical element 40 according to the present embodiment, different from the optical element according to the related art, the first liquid 44 and the second liquid 46 having the same specific gravity are not selected, and the first liquid 44 is formed by mixing the three kinds of liquids, each of which has different specific gravity, with one another. Therefore, the specific gravity of the first liquid can be varied over a wide range, as shown by a region R in FIG. 8.

That is, in a case in which the two kinds of liquids with different specific gravity are mixed with each other, the specific gravity of the first liquid that is obtained by changing the mixing ratio between the two kinds of liquids can be changed within only a range of a straight line that connects the coordinates of the liquids, as shown in FIG. 7.

Meanwhile, in a case in which the three kinds of liquids are mixed with one another, as shown in FIG. 8, the specific gravity of the first liquid 44 can be varied in a large triangular region R that connects the three coordinates of pure water, ethanol, and ethylene glycol.

Accordingly, the specific gravity of the first liquid 44 and the specific gravity of the second liquid 46 can simply be made to be substantially the same. As a result, it is possible to simply manufacture an optical element 40 having desired characteristics.

Further, as shown in FIGS. 8 and 9, at least three kinds of liquids, each of which has different specific gravity and a different refractive index, for example, the pure water, the ethanol, and the ethylene glycol are mixed with one another, and thus the first liquid 44 is obtained. Therefore, the specific gravity of the first liquid 44 and the specific gravity of the second liquid 46 can simply be made to be substantially the same. At the same time, the refractive index of the first liquid 44 and the refractive index of the second liquid 46 can simply be made to be substantially the same. Therefore, it is possible to prevent a lens effect from occurring.

Further, in the optical element 40, the case has been described in which the pure water, the ethanol, and the ethylene glycol are used as a plurality of kinds of liquids to obtain the first liquid 44. However, the plurality of kinds of used liquids are not limited to the pure water, the ethanol, and the ethylene glycol, but various existing liquids may be selected.

Figure 10:
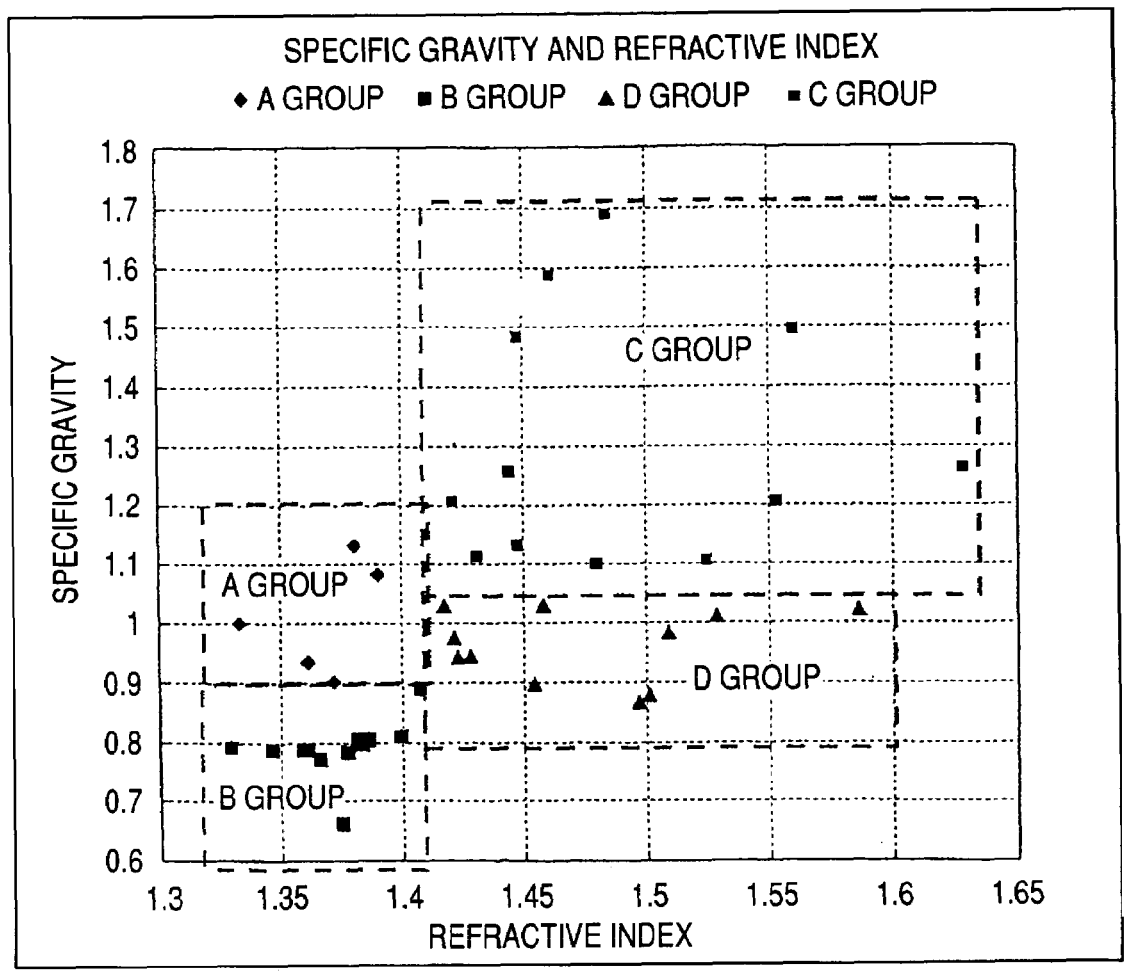
FIG. 10 is a diagram illustrating specific gravity and refractive indexes of various kinds of liquids.

FIG. 10 is a diagram illustrating specific gravity and refractive indexes of various kinds of liquids, and FIG. 11 is a diagram illustrating numerical values of specific gravity and refractive indexes of various used liquids.

For example, as shown in FIG. 10, as used liquids, an A group, a B group, a C group, and a D group are exemplified, and specific names of the liquids that are used in the A to D groups are shown in FIG. 11.

In the A group, the refractive index is not less than 1.32 and less than 1.41, and its specific gravity is not less than 0.9 and less than 1.2.

In the B group, the refractive index is not less than 1.32 and less than 1.41, and the specific gravity is not less than 0.6 and less than 0.9.

In the C group, the refractive index is not less than 1.41 and less than 1.63, and the specific gravity is not less than 1.05 and less than 1.7.

In the D group, the refractive index is not less than 1.41 and less than 1.6, and the specific gravity is not less than 0.8 and less than 1.05.

Accordingly, the mixing ratio is varied in the a large triangular region that connects the coordinates of three kinds of liquids selected from any three groups selected from A to D groups as the three kinds of liquids, and thus the specific gravity and the refractive index can be varied.

That is, various known liquids in the related art are selected, and a mixing ratio between the selected liquids is varied. As a result, the specific gravity and the refractive index can be simply varied.

The kinds of liquids that are used in the first liquid are not limited to the three kinds, and may be four kinds or more.

Figure 12:
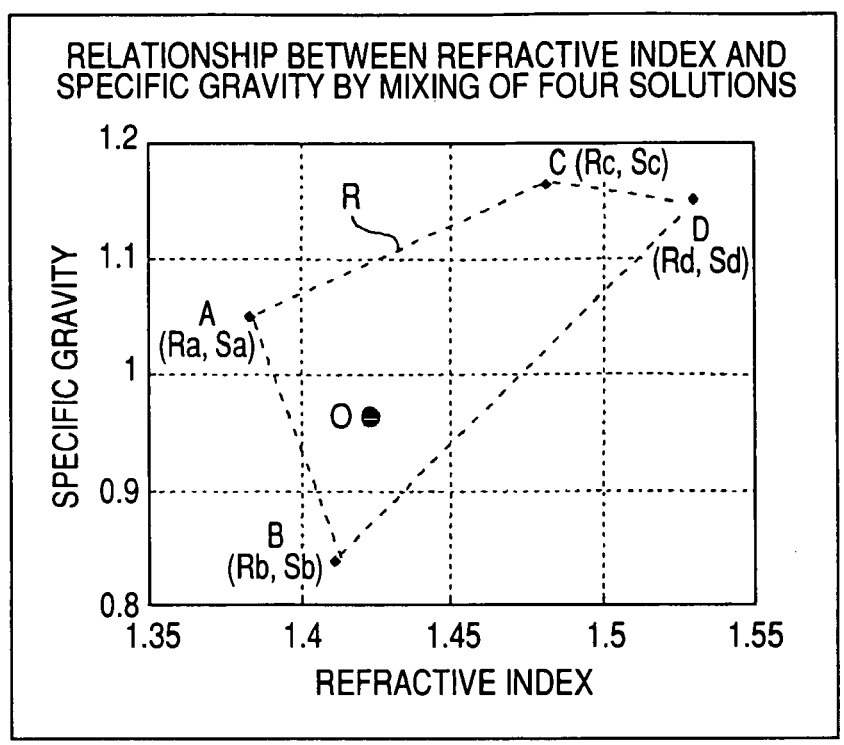
FIG. 12 is a diagram illustrating an adjustment range of a refractive index and specific gravity in a case in which four kinds of liquids A, B, C, and D are mixed.
Figure 13:
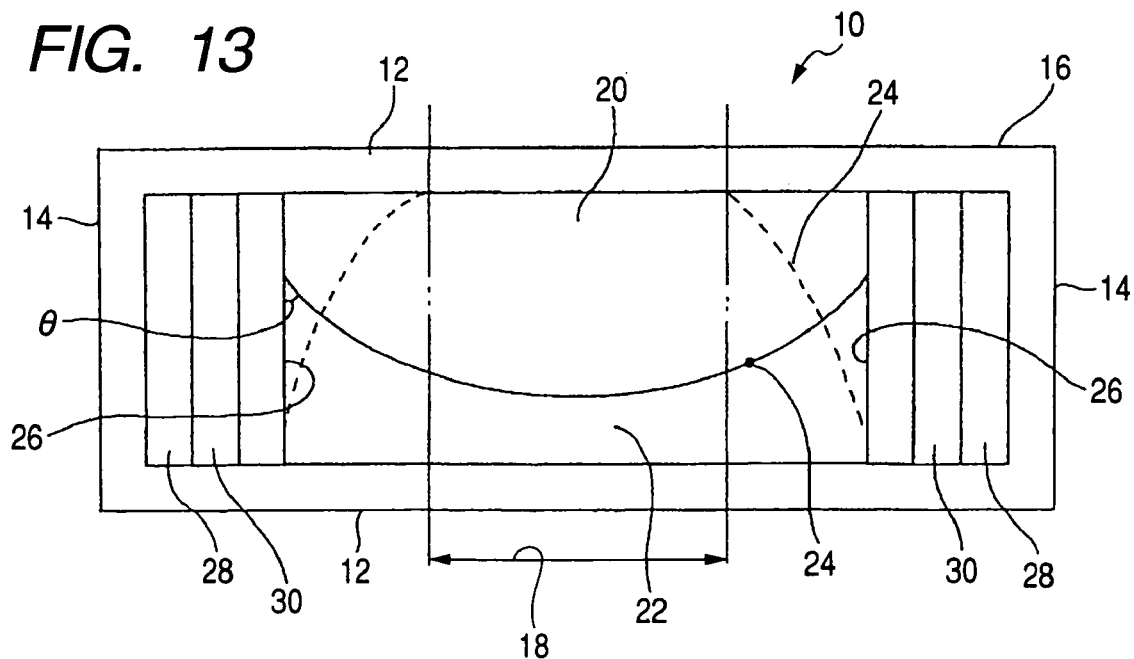
FIG. 13 is a diagram illustrating a structure of an optical element according to the related art.

As shown in FIG. 12, when the first liquid 44 is obtained by mixing four kinds of liquids A (whose refractive index is Ra, and whose specific gravity is Sa), B (whose refractive index is Rb, and whose specific gravity is Sb), C (whose refractive index is Rc, and whose specific gravity is Sc), and D (whose refractive index is Rd, and whose specific gravity is Sd), by varying a mixing ratio among the four kinds of liquids A, B, C, and D, the refractive index and the specific gravity of the first liquid 44 can be simply adjusted in a rectangular region R connecting the coordinates (Ra, Sa), the coordinates (Rb, Sb), the coordinates (Rc, Sc), and the coordinates (Rd, Sd), as shown by the coordinates O in FIG. 12.

Even in this case, the silicone oils (not shown) on the market that are scattered in the rectangular region R are used as the second liquid 46, and the four kinds of liquids are mixed to obtain the first liquid 44 whose specific gravity and refractive index are made to become substantially the same as the silicone oil.

Further, in the optical element 40, the case has been described in which single silicone oil is used as the second liquid 46. However, the plurality of kinds of silicone oils, each of which has a different refractive index or specific gravity, exist, one kind of silicone oil having desired characteristic may be selected to be used as the second liquid 46, or a plurality of kinds of silicone oils having different characteristic are selected, the mixing ratio between the plurality of kinds of silicone oils is varied to have a desired refractive index and desired specific gravity, and then used as the second liquid 46.

Further, in the optical element 40, the case has been described in which a direct current voltage is applied to the first liquid 44 to generate electrocapillarity. The voltage applied to the first liquid 44 is not limited to the direct current voltage, and an alternating current voltage or a pulse voltage, or a voltage that increases or decreases step by step may be used. That is, if electrocapillarity is generated in the first liquid 44, any voltage also may be used.

It should be understood by those skilled in the art that various modifications, combinations, sub-combinations and alterations may occur depending on design requirements and other factors insofar as they are within the scope of the appended claims or the equivalents thereof.

The invention claimed is:

1. An optical element, comprising:
   an airtight container having opposing first and second end face walls in a thickness direction, and side walls connecting the first and second end face walls;
   a first liquid sealed in the container and having polarity or conductivity;
   a second liquid sealed in the container and not mixed with the first liquid so as to form an interface between the first liquid and the second liquid; and
   voltage applying means for applying a voltage to the first liquid,
   wherein the first liquid and the second liquid have substantially the same specific gravity, and the first liquid has less light transmittance than the second liquid,
   in a state in which the voltage is applied to the first liquid, the interface between the first liquid and the second liquid deforms, and a transmitting path of light is formed that passes through the first and second end face walls and propagates in the thickness direction of the container,
   a first film is formed over the entirety of an inner surface of the first end face wall, the wettability of the first film with respect to the first liquid being higher than the wettability of the first film with respect to the second liquid,
   a second film is formed over the entirety of an inner surface of the second end face wall, the wettability of the second film with respect to the second liquid being higher than the wettability of the second film with respect to the first liquid,
   the voltage applying means includes a first electrode provided on the first end face wall, and a second electrode provided on the second end face wall, and
   in a state in which the voltage is not applied to the first liquid, the second liquid is located on the second film, and the first liquid extends over the entire region of a direction orthogonal to a light transmitting direction.

2. The optical element according to claim 1, wherein the first film is formed to cover a surface of the first electrode, and the second film is formed to cover a surface of the second electrode.

3. The optical element according to claim 1, wherein the voltage applying means includes an insulating film formed between the second film and the second electrode.

4. The optical element according to claim 1, wherein the second liquid is made of silicone oil.

5. The optical element according to claim 1, wherein the second film is formed of a material using silicone as a principal ingredient.

6. The optical element according to claim 1, wherein the second film is formed of a material of an amorphous fluorine resin.

7. The optical element according to claim 1, wherein a contact angle of the second liquid with respect to the second film is within a range of 0 to 30 degrees.

8. The optical element according to claim 1, wherein the interface between the first liquid and the second liquid maintains a convex curved shape from the first liquid to the second liquid regardless of whether a voltage is applied to the first liquid.

9. The optical element according to claim 1, wherein the first liquid includes a plurality of kinds of liquids, and the plurality of kinds of liquids include at least one of water, ethanol, and ethylene glycol.

* * * * *